United States Patent [19]
Thompson et al.

[11] 3,822,010
[45] July 2, 1974

[54] PRODUCT CARRIER FOR CHILLING MACHINE

[76] Inventors: Phil W. Thompson, 13307 Spring St.; Ralph F. Thompson, 11919 Bennington, both of Grandview, Mo. 64030

[22] Filed: Mar. 2, 1973

[21] Appl. No.: 337,635

[52] U.S. Cl. .................. 198/152, 62/382, 198/145, 220/DIG. 13
[51] Int. Cl. ........................................... B65g 17/16
[58] Field of Search .......... 198/145, 151, 152, 131; 99/517, 355; 211/126, 127, 164; 62/374, 382; 220/DIG. 13; 294/68

[56] References Cited
UNITED STATES PATENTS
| | | | |
|---|---|---|---|
| 2,476,039 | 7/1949 | Hapman | 198/149 |
| 3,049,135 | 8/1962 | Kuhl et al. | 198/131 |
| 3,145,829 | 8/1964 | Janouschek et al. | 198/131 |

Primary Examiner—Richard A. Schacher
Assistant Examiner—Richard K. Thomson
Attorney, Agent, or Firm—John A. Hamilton

[57] ABSTRACT

A carrier for supporting objects to be chilled in their travel through a chilling machine in which they are subjected to sprays of a refrigerant liquid, and particularly adapted for use with either round or square sausage products, consisting of a generally semi-cylindrical, upwardly-opening bucket adapted to be supported from conveyor chains or the like, its shape adapting it to support round or "chub" sausage products, having longitudinally extending right-angled outward offsets defining a flat floor adapting it to support square sausage products without sagging thereof, and having drain openings for the refrigerant liquid so positioned to drain the bucket effectively whether round or square product is being supported thereby.

5 Claims, 4 Drawing Figures

PATENTED JUL 2 1974 3,822,010
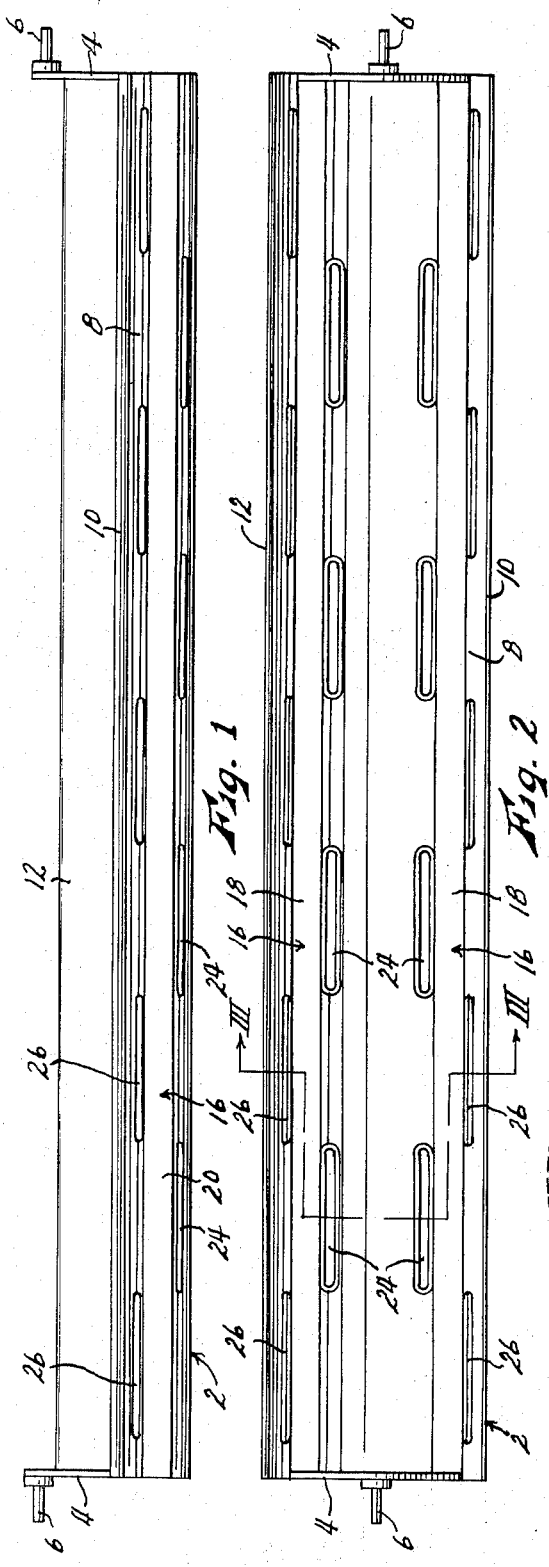
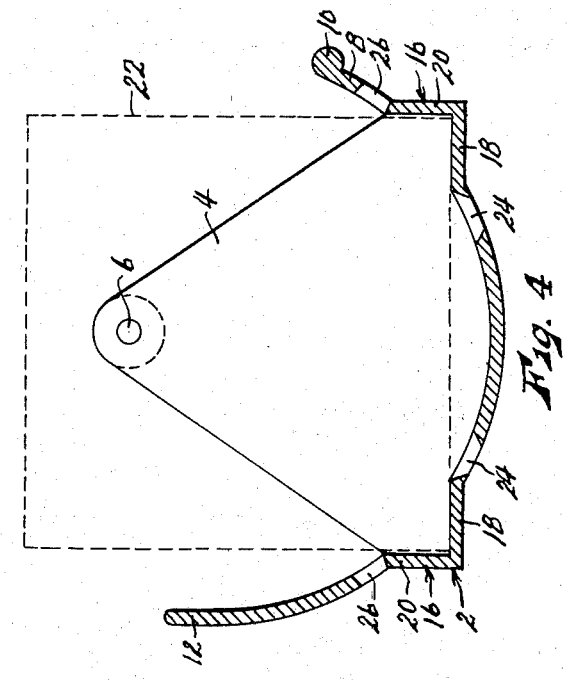

3,822,010

PRODUCT CARRIER FOR CHILLING MACHINE

This invention relates to new and useful improvements in chilling machines used for removing heat from food products, and has particular reference to a carrier for supporting and carrying sausage products through such a chilling machine.

The principal object of the present invention is the provision of a carrier for the purpose indicated which is adapted in a novel manner to carry selectively either round or square sausage products as it is moved through the chilling machine, in which it is subjected either to sprays or a rain-like fall of a refrigerated liquid to remove heat therefrom.

A further object is the provision of a carrier of the character described which is so configurated as to offer sufficient support to the product to prevent sagging thereof, whether the product is round or square, the product usually being quite hot, soft and easily deformed when it enters the chilling machine, while at the same time having a minimum area contact with the product so as to permit free circulation of the refrigerant liquid over the surface thereof.

Another object is the provision of a product carrier of the character described having drain openings so disposed as to provide effective coverage of the product by the refrigerant liquid, and drainage of said liquid from the carrier, regardless of whether the product is round or square.

Other objects are simplicity and economy of structure, and efficiency and dependability of operation.

With these objects in view, as well as other objects which will appear in the course of the specification, reference will be had to the accompanying drawing, wherein:

FIG. 1 is a front elevational view of a product carrier embodying the present invention, FIG. 2 is a top plan view of the carrier as shown in FIG. 1, FIG. 3 is an enlarged sectional view taken on line III-III of FIG. 2, showing a round sausage product supported in the carrier in dotted lines, and FIG. 4 is a view similar to FIG. 3, but showing a square sausage product supported in the carrier.

Like reference numerals apply to similar parts throughout the several views, and the numeral 2 applies generally to the body member of the carrier. Said body member may be formed of stainless steel, plastic or other suitable material and has the form of a generally semi-cylindrical, upwardly opening bucket or trough. It may be of any desired length as required by any particular chilling machine, lengths of from 4 to 6 feet being common. It is provided at each end with an integral end wall 4 which projects upwardly and has an outwardly extending pintle 6 affixed to its upper end. The pintles 6 are coaxial and parallel to the longitudinal extent of the carrier, and are utilized for mounting the carrier between a pair of parallel, moving conveyor chains, which move a continuous series of the carriers through the cabinet of a chilling machine, where the sausage product supported in the carriers is subjected to sprays or to a rain-like fall of a refrigerated liquid to remove heat therefrom, as is common and well known in the art. The pintles provide a pivotal support for the carrier, and are disposed above the center of gravity thereof, so that it remains upright even during inclined or vertical movement of the conveyor chains. A vertically arranged serpentine path for the carriers in the chilling cabinet is commonly used, in order to provide a greater retention time of the product in the cabinet.

The cross-sectional contour of the carrier is best shown in FIGS. 3 and 4. It is generally semi-cylindrical in form, opening upwardly. Its front wall 8 is somewhat abbreviated in height for ease of loading products therein, and its top edge is thickened to provide an enlarged, smooth lip 10 which is not likely to "dent" or malform product which may be bumped thereagaint during loading. Its back wall 12 is of greater height, and may be used to steady the carrier against any suitable support during loading of product therein, in order to prevent the carrier from swinging to an excessive degree on its pintles 6, which might otherwise cause spillage of product from the carrier. The radius of curvature of the cross-sectional contour of the carrier is somewhat greater than that of a round sausage product 14 to be supported therein as shown in FIG. 3, so that said product normally engages the carrier with only a narrow line contact along the centerline of the bottom of the carrier. The sausage product is of course cased before it is inserted in the carrier, said product cases being of variable lengths. Each carrier may carry as many of the sausages, often designated chubs, as premitted by its own length.

The semi-cylindrical general cross-sectional countour of the carrier is also varied by the provision of a pair of right-angled outward offsets 16 adjacent the bottom thereof, as best shown in FIGS. 3 and 4. Each of said offsets includes a horizontal wall 18 and a vertical wall 20 rising from the outer edge of the horizontal wall. Horizontal walls 18 are coplanar, and are spaced apart equally at opposite sides of the vertical mid-plane of the carrier. Also, they are spaced above the bottom of the carrier at such a height that their combined transverse widths is equal to about one-third of the transverse distance between vertical walls 20, for a reason which will presently appear. Vertical walls 20 are of course parallel with each other.

Horizontal walls 18 are adapted to support a square sausage product 22, or "loaf", as shown in FIG. 4, with vertical walls 20 serving to confine and position the product on the horizontal walls. The horizontal walls therefore provide a planar area support for the product under about one-third of the total area of its bottom surface, with the proportions stated, while leaving the remaining two-thirds of its bottom surface spaced above the center bottom area of the carrier to permit circulation of refrigerant liquid therebetween. The exposure of the maximum possible proportion of the product area to the circulating regrigerant liquid is of course desirable to provide maximum efficiency of the cooling action, and the structure shown provides exposure of all of the square product area except about one-third of the area of its bottom surface. The proportion of the round product area exposed is even greater. Some support area is of course absolutely essential to prevent "flowing" deformation of the product while it is still hot and soft before it can be further solidified and stiffened by removal of heat therefrom. The problem of proper support is greater in the case of square product than with round product, since the round product can be supported without significant deformation by only a narrow line contact, as shown, while the square product cannot be supported without significant deformation by line contact, as for example by a narrow ridge disposed therebeneath or by tilting so as to rest on one of its corners, but requires planar support of substantial area beneath its lower surface. The present structure provides support beneath about one-third of its lower surface, the support area being divided equally into two strips along its opposite longitudinal edges. While the one-third figure is not particularly critical, and could vary somewhat with the make-up and entry temperature of the product, it has been found to function efficiently for nearly all sausage products, providing maximum exposure to the refrigerant, combined with support adequate to prevent deformation before it can be solidified by cooling. Any substantially greater support area results in poor exposure to the refrigerant, with possibly inadequately cooled zones in the product, while any substantially smaller support area will permit deformation of the product before it can be solidified by cooling. The carrier actually shown has been designed to carry selectively either 5 inch diameter round product, or 4½ inch square product, these being extremely common and widely used sizes, but it will be readily apparent that carriers sized to handle products of any dimensions could readily be produced.

As previously mentioned, product supported in the carrier is cooled or chilled by a liquid refrigerant directed downwardly thereover in sprays, or in a rain-like fall, as the carrier is moved through a chilling machine cabinet. The refrigerant passes downwardly over the product in a flowing film, and of course enters the carrier. The liquid cannot be allowed to accumulate in the carrier, since it would then be warmed by the product, and shield the product against the flow of fresh liquid thereover. The carrier must therefore be provided with drain openings. The placement of the drain openings is of some importance. As shown, there are provided two sets of drain openings 24 and 26. The openings comprise slots, elongated longitudinally of the carrier. Openings 24 are arranged in two rows in the curved portion of the carrier between the horizontal walls 18 of offsts 16, respectively directly adjacent the merger of said curved portion with said horizontal walls. Openings 26 are formed in two rows in the curved portions of the carrier above offsets 16, respectively directly adjacent the merger of said curved portions with the vertical walls 20 of the offsets. Openings 24 come into use when the carrier supports round product 14, as in FIG. 2. Since the carrier is of a greater radius of curvature than the product, the product cannot cover and seal said openings to prevent egress of liquid, and the liquid cannot accumulate to any appreciable depth to shield the product from fresh liquid. Openings 26 come into use when the carrier supports square product 22 as in FIG. 4. Liquid film flowing downwardly over the product then exits through openings 26, even though it cannot flow directly to openings 24, and any appreciable depth of accumulation is prevented. Some liquid may still enter the bottom curvature of the carrier, as by flowing around the ends of the sausages, but this liquid is also prevented from accumulating by its drainage through openings 24.

It is considered that the operation of the carrier has been adequately and fully described in connection with the foregoing description of its structure. It is considered to have certain obious advantages, in that it will carry, selectively, either round or square sausage products, in either case providing support for the product fully adequate to prevent any appreciable deformation of the product before it can be solidified and stiffened by cooling thereof, while at the same time providing for a minimum area contact thereof with the product, in order to promote a more thorough coverage of the product, and hence more efficient cooling of the product, by a liquid refrigerant flowed thereover.

While we have shown and described a specific embodiment of our invention, it will be readily apparent that many minor changes of structure and operation could be made without departing from the spirit of the invention.

What we claim as new and desire to protect by Letters Patent is:

1. A carrier for supporting either round or square sausage product for movement through a product chilling machine in which a liquid refrigerant is flowed downwardly thereover, said carrier comprising:
  a. an elongated body member of generally semi-cylindrical, upwardly opening cross-sectional contour adapted to support round sausage product longitudinally in the bottom thereof, and having right-angled outward offsets formed longitudinally in the lower portion thereof at respectively opposite sides of the longitudinal midline thereof, said offsets having coplanar horizontal walls adapted to support square sausage product and vertical walls rising from the distal edges of said horizontal walls, said body member having drainage openings formed therein, and
  b. means carried by said body member for attaching it to a conveyor for movement through said chilling machine.

2. A carrier as recited in claim 1 wherein the generally semi-cylindrical curvature of said body member has a radius somewhat greater than that of the round sausage product to be supported thereby, whereby said product has only a narrow line contact with said carrier.

3. A carrier as recited in claim 1 wherein the lateral distance between the vertical walls of said housing offsets is only slightly greater than the cross-sectional dimensions of a square sausage product to be supported by the horizontal walls of said offsets, and wherein said horizontal offset walls are spaced above the extreme bottom of the body member at such a distance that the combined transverse width of said horizontal walls is equal to about one-third of the transverse distance between said vertical offset walls.

4. A carrier as recited in claim 3 wherein the generally semi-cylindrical curvature of said body member has a radius somewhat greater than that of the round sausage product to be supported thereby.

5. A carrier as recited in claim 4 wherein some of said drainage openings are formed in the curved portion of said body member directly adjacent the merger of said curved portion with said horizontal offset walls, and some of said drainage openings are formed in the curved portion of said body member directly adjacent the merger of said curved portion with the upper edges of said vertical offset walls.

* * * * *